UNITED STATES PATENT OFFICE.

GEORGE A. MARSH, OF CARNEGIE, PENNSYLVANIA.

PROCESS OF SOFTENING BASE BULLION.

SPECIFICATION forming part of Reissued Letters Patent No. 11,579, dated December 8, 1896.

Original No. 569,293, dated October 13, 1896. Application for reissue filed November 6, 1896. Serial No. 611,295.

*To all whom it may concern:*

Be it known that I, GEORGE A. MARSH, a citizen of the United States, residing at Carnegie, in the county of Allegheny and State of Pennsylvania, have invented or discovered a certain new and useful Improvement in Softening Base Bullion, of which improvement the following is a specification.

The invention described herein relates to certain improvements in the method of softening base bullion preparatory to desilverizing the same.

The method in most general use consists in maintaining the molten bullion at a high temperature and allowing currents of air to pass over the surface of the molten metal, so as to oxidize the impurities contained therein. This treatment is carried on until the antimony is reduced to or below six-tenths of one per cent., or to a point where the treated metal can be advantageously subjected to the action of zinc for desilverizing. This method of treatment is slow and expensive on account of the fuel required to maintain the bath for a long period at a high temperature.

It has been attempted to hasten the softening operation by introducing steam into the molten metal, thereby violently agitating the metal and presenting larger surfaces to the oxidizing action of the air. This method is objectionable, as it is carried below a temperature at which litharge can be reduced, so that the large amount of litharge produced remains in the skim and has an injurious effect on the walls of the furnace, and the amount of skim to be worked over is greatly increased.

The antimony and arsenic in the base bullion have been removed by adding litharge from a cupeling-furnace to the molten metal, which is raised to such a temperature that a chemical reaction will occur, the oxygen of the litharge, combining with the arsenic and antimony, forming an oxid thereof, which will be removed with the skim. This method, while effective in removing the arsenic and antimony, is used only in treating very hard bullion, and will not result in any saving of time or expense in treating ordinary bullion.

In the practice of my invention the base bullion is melted and raised to such a temperature that litharge will be reduced by the arsenic and antimony, such temperature being above the melting-point of litharge and preferably about a bright-red heat. When so heated, a pipe is inserted into the molten metal and a suitable fluid, preferably dry steam, is forced into the metal, producing a violent ebullition and the consequent exposure of large surfaces to the oxidizing action of air. As the elimination of the arsenic and antimony is effected by the reduction of litharge, the molten charge should be maintained at a temperature not less than the melting-point of litharge, and preferably at a bright-red heat, until the arsenic and antimony have been eliminated as far as practicable.

The molten charge should be maintained at a temperature not less than the melting-point of litharge during the elimination of arsenic and antimony. As soon as the arsenic and antimony have been reduced to or below seven or eight tenths (.7 or .8) of one per cent. the fire is drawn, the doors of the furnace are opened for the purpose of cooling the bullion and the admission of more air for oxidizing the lead, and kept open until the treatment has been completed. This opening of the doors and consequent cooling of the bullion does not affect the carrying on of the process, as the bullion is and will remain hot sufficiently long to permit of the elimination of the impurities, as hereinafter stated. While it is preferred to draw the fire and open the furnace-doors when the arsenic and antimony have been reduced to or below seven or eight tenths (.7 or .8) of one per cent., as a saving of fuel and time is thereby effected, the doors may be kept closed and the firing continued until the process of eliminating the arsenic and antimony has been completed. As a result of this operation not only arsenic and antimony and other impurities are oxidized, but a considerable proportion of lead is reduced to litharge.

As the process is carried on at a temperature at which arsenic and antimony will be reacted upon by litharge, the formation of the latter is beneficial for the reason that the litharge will react upon the arsenic and antimony which have not been previously oxidized by the air, the oxygen of the litharge, combining with the arsenic and antimony, forming an oxid which is removed with the skim. The reactions which occur between the litharge, arsenic, and antimony are indicated by the following formulas:

$$3PbO+2As=As_2O_3+3Pb$$

and $$3PbO+2Sb=Sb_2O_3+3Pb.$$

As the result of forming the litharge *in situ* and at such a temperature and under such conditions as permit of its being reduced by the arsenic and antimony, portions of which are at the same time being oxidized by the air, the time required for the softening process is greatly shortened, and as by this process the arsenic and antimony are almost wholly eliminated and in a shorter time than has heretofore been required for a partial elimination the amount of zinc required in the subsequent desilverizing process is greatly reduced and subsequent processes are shortened, the losses in such processes reduced, and the quality of the refined lead improved.

I claim herein as my invention—

1. As an improvement in the art of treating bullion containing lead, arsenic, antimony, and other oxidizable impurities, but substantially free from zinc, the method herein described for removing arsenic, antimony, and other oxidizable impurities, which consists in melting the bullion, heating the molten bullion to a temperature at which litharge will be reduced by the arsenic and antimony, *i. e.* about a bright-red heat, and then promoting the formation of litharge or oxid of lead in the molten bullion by any known means of oxidizing, and thereby permitting of the reduction of the litharge by the arsenic and antimony, and the consequent elimination of such impurities, substantially as set forth.

2. As an improvement in the art of treating bullion containing lead, arsenic, antimony, or other oxidizable impurities, but substantially free from zinc, the method herein described for removing the arsenic, antimony, and other oxidizable impurities which consists in melting the bullion, heating the molten bullion to a temperature at which litharge will be reduced by arsenic and antimony, *i. e.* about a bright-red heat, and then promoting the formation of litharge and other oxids by forcing a fluid into the molten bullion, whereby the molten bullion is agitated, subjecting large surfaces of the metal to the oxidizing action of the air, and opportunity is afforded for the reduction of the litharge by the arsenic and antimony, substantially as set forth.

3. As an improvement in the art of treating bullion containing lead, arsenic, antimony, and other oxidizable impurities, but substantially free from zinc, the method herein described for removing the arsenic, antimony, and other impurities, which consists in melting the bullion, heating the bullion to a temperature at which litharge will be reduced by arsenic and antimony, *i. e.* about a bright-red heat, promoting the formation of litharge or oxid of lead in the molten bullion by any known means of oxidizing, and thereby permitting of the reduction of the litharge by the arsenic and antimony, and the consequent elimination of such impurities, and finally subjecting the softened bullion to any suitable desilverizing process, substantially as set forth.

In testimony whereof I have hereunto set my hand.

GEORGE A. MARSH.

Witnesses:
DARWIN S. WOLCOTT,
F. E. GAITHER.